United States Patent
Kishimoto et al.

(10) Patent No.: US 6,545,857 B2
(45) Date of Patent: Apr. 8, 2003

(54) CHIP-TYPE ELECTRONIC COMPONENT AND MANUFACTURING METHOD THEREFOR

(75) Inventors: Atsushi Kishimoto, Kusatsu (JP); Masahiro Kodama, Kusatsu (JP); Hideaki Nimi, Hikone (JP)

(73) Assignee: Murata Manufacturing Co. Ltd. (JP)

( * ) Notice: Subject to any disclaimer, the term of this patent is extended or adjusted under 35 U.S.C. 154(b) by 56 days.

(21) Appl. No.: 09/910,122

(22) Filed: Jul. 20, 2001

(65) Prior Publication Data

US 2002/0027764 A1 Mar. 7, 2002

(30) Foreign Application Priority Data

Jul. 21, 2000 (JP) ......................................... 2000-220694

(51) Int. Cl.$^7$ ................................................ H01G 4/06

(52) U.S. Cl. ............................... 361/321.2; 361/321.5; 29/25.42

(58) Field of Search .................................. 361/311, 312, 361/313, 321.2, 321.5, 321.3; 29/25.41, 25.42

(56) References Cited

U.S. PATENT DOCUMENTS

| | | | | |
|---|---|---|---|---|
| 4,663,694 A | * | 5/1987 | Sakamoto | 361/305 |
| 5,347,423 A | * | 9/1994 | deNeuf et al. | 361/313 |
| 6,366,443 B1 | * | 4/2002 | Devoe et al. | 361/313 |

FOREIGN PATENT DOCUMENTS

JP 3-250603 11/1991

* cited by examiner

*Primary Examiner*—Anthony Dinkins
(74) *Attorney, Agent, or Firm*—Dickstein, Shapiro, Morin & Oshinsky LLP.

(57) ABSTRACT

A chip-type electronic component is provided in which generation of cracks in a glass coating layer and degradation of the insulating resistance in the ceramic body is unlikely to occur. In addition, a manufacturing method therefor is also provided. In the glass coating layer described above, the ratio of the alkali metal content to the silicon content is gradually increased from the vicinity of the glass coating layer to the inside thereof. The component is formed by forming a glass coating layer on surfaces of the component, in which the ratio of the alkali metal to the silicon in the glass coating layer is 0.3 or more; and a subsequent step of dipping the component provided with the glass coating layer in an acidic aqueous solution.

12 Claims, 1 Drawing Sheet

CHIP-TYPE ELECTRONIC COMPONENT AND MANUFACTURING METHOD THEREFOR

BACKGROUND OF THE INVENTION

1. Field of the Invention

The present invention relates to chip-type electronic components, and more particularly, relates to a chip-type electronic component comprising a ceramic body and to a manufacturing method therefor.

2. Description of the Related Art

Various electronic components including such as laminated ceramic capacitors have been formed into chip-type components in order to reduce the mounting area on a circuit board and making a size of the circuit board smaller. However, since the surface of the ceramic for use in the electronic components is exposed to the outside, the reliability in terms of humidity resistance and the like has not been satisfactory. Accordingly, a technique to realize superior reliability is disclosed in Japanese Unexamined Patent Application Publication No. 3-250603 in which the surface of a ceramic exposed to the outside is covered by a glass coating layer.

However, generation of cracks is likely to occur in the glass coating layer in the chip-type ceramic electronic component described above, and hence, degradation of the insulating resistance or the like occurs in the ceramic body.

SUMMARY OF THE INVENTION

Accordingly, an object of the present invention is to provide a chip-type electronic component in which generation of cracks in the glass coating layer is unlikely to occur, and hence, degradation of the insulating resistance in the ceramic body is unlikely to occur. In addition, the present invention also provides a manufacturing method therefor.

To these ends, a chip-type electronic component of the present invention comprises a ceramic body and a glass coating layer provided on the body, wherein the composition ratio of alkaline element(s) to the silicon element in the glass coating layer is gradually increased from the vicinity of the surface of the glass coating layer to the inside thereof. In this connection, the vicinity of the surface means the border defined by the place at which the influence of moisture and carbon dioxide in the air adsorbed on the surface of the glass coating layer disappears.

In the chip-type electronic component having the structure described above, since the atomic ratio of the alkaline metal content to the silicon content in the glass coating layer is gradually increased from the vicinity of the surface of the glass coating layer to the inside thereof, generation of cracks is unlikely to occur in the glass coating layer and degradation of the insulating resistance in the ceramic body is also unlikely to occur.

The ceramic electronic component described above can be obtained by a step of forming a glass coating layer on a surface of a body comprising a ceramic, in which the atomic ratio of the alkali metal content to the silicon content in the glass coating layer is about 0.3 or more; and a step of dipping the body provide with the glass coating layer in an acidic aqueous solution.

DESCRIPTION OF THE PREFERRED EMBODIMENTS

Hereinafter, embodiments of a chip-type electronic component of the present invention and a manufacturing method therefor will be described. In the embodiments, a laminated capacitor will be described as the chip-type electronic component by way of example. In order to verify the advantage of the present invention, a component manufactured in accordance with the manufacturing method of the present invention is described in Example 1, and components manufactured in order to compare with the component in Example 1 are described in Comparative Examples 1 and 2.

Figure 1:
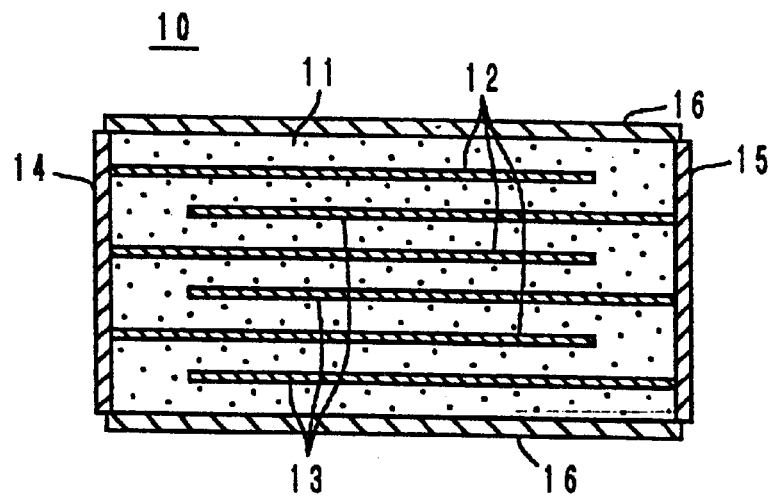
FIG. 1 is a cross-sectional view of a chip-type electronic component of an embodiment according to the present invention.

As shown in FIG. 1, a laminated capacitor 10 of the present invention is composed of a laminated body 11 formed by sintering laminated ceramic green sheets provided with internal electrodes 12 and 13 printed thereon; external electrodes 14 and 15 formed on two side surfaces of the laminate 11; and glass coating layers 16 covering the laminate 11 other than the surfaces on which the external electrodes are formed. A method for manufacturing the laminated capacitor 10 is described in Example 1.

In order to verify the advantage of the present invention, first, the laminated capacitor 10 is formed by the manufacturing method of the present invention as Example 1.

First, $(Ba_{0.80}Ca_{0.2})_{1.005}TiO_3$ in a powdered form was prepared from starting materials, that is, $BaCO_3$, $CaCO_3$ and $TiO_2$.

Next, the powdered material thus prepared was mixed and pulverized with purified water by using zirconic balls for 5 hours, and after drying was performed, calcining was performed at 1,100° C. for 2 hours. To the calcined powdered material thus obtained, an organic binder, a dispersing agent and water are added, and after the mixture thus formed was mixed by using zirconic balls, green ceramic sheets were formed therefrom.

Subsequently, a paste containing nickel (Ni) was applied on the green sheets by a printing method or the like, thereby forming internal electrodes. Next, the green sheets are laminated with each other for forming a laminate so that the internal electrodes oppose each other with the green sheets provided therebetween, and after protecting green sheets are disposed on the top and the bottom surfaces the laminate, the laminate provided with the protecting green sheets was bonded by compression and was then cut into a laminated body having a predetermined size. Next, the laminated body thus obtained was fired at 1,300° C. in a reducing gas composed of hydrogen ($H_2$) gas and nitrogen ($N_2$) gas, thereby forming a sintered laminate 11 shown in FIG. 1 having the internal electrodes 12 and 13 therein. Next, after an electrode paste was adhered to the two side surfaces of the sintered laminate 11 by a dipping method or the like, drying and firing were performed on the sintered laminate 11, thereby forming the external electrodes 14 and 15.

After the laminate provided with the external electrodes was dipped in an aqueous solution of a sodium silicate (Na/Si=0.6) at a concentration of 15 wt % for 10 minutes and was fired at 500° C., glass coating layer 16, which had an atomic ratio of the alkali metal content to the silicon content of about 0.3 or more, was formed on the laminate. In addition, as an acid treatment, the laminate provided with the glass coating layer was dipped in an aqueous solution of a sulfuric acid having a pH of 4.0 for 1 hour, thereby forming the laminated capacitor 10.

In order to compare with the advantage of the present invention, as Comparative Example 1, a laminated capacitor was formed in a manner equivalent to that in Example 1 except that the acid treatment, which was performed for 1 hour using an aqueous solution of a sulfuric acid having a pH of 4.0 in Example 1, was not performed.

Furthermore, in order to compare with the advantage of the present invention, as Comparative Example 2, a laminated capacitor was formed as a sample in a manner equivalent to that in Example 1 except that the laminate was dipped in an aqueous solution of a silica sol containing no alkali metal instead of the aqueous solution of a sodium silicate at a concentration of 15 wt %.

For the laminated capacitors formed in Example 1 and Comparative Examples 1 and 2, measurement of insulating resistance was performed, and in addition, the conditions of the glass coating layers thereof were investigated by a scanning electron microscope (SEM). The measurement results are shown in Table 1. The insulating resistance of the ceramic body formed in Comparative Example 1 was degraded and cracks occurred in the glass coating layer formed in Comparative Example 2.

TABLE 1

|  | Concentration Gradient of Alkali Metal Content to Silicon Content | Cracks in Glass Coating Layer | Insulating Resistance in Ceramic Body ($\Omega \cdot cm$) |
|---|---|---|---|
| Example 1 | Gradual Increase | No | $10^{12}$ |
| Comparative Example 1 | No Gradual Increase | No | $10^{8}$ |
| Comparative Example 2 | No Alkali Metal Element | Yes | $10^{12}$ |

Figure 2:
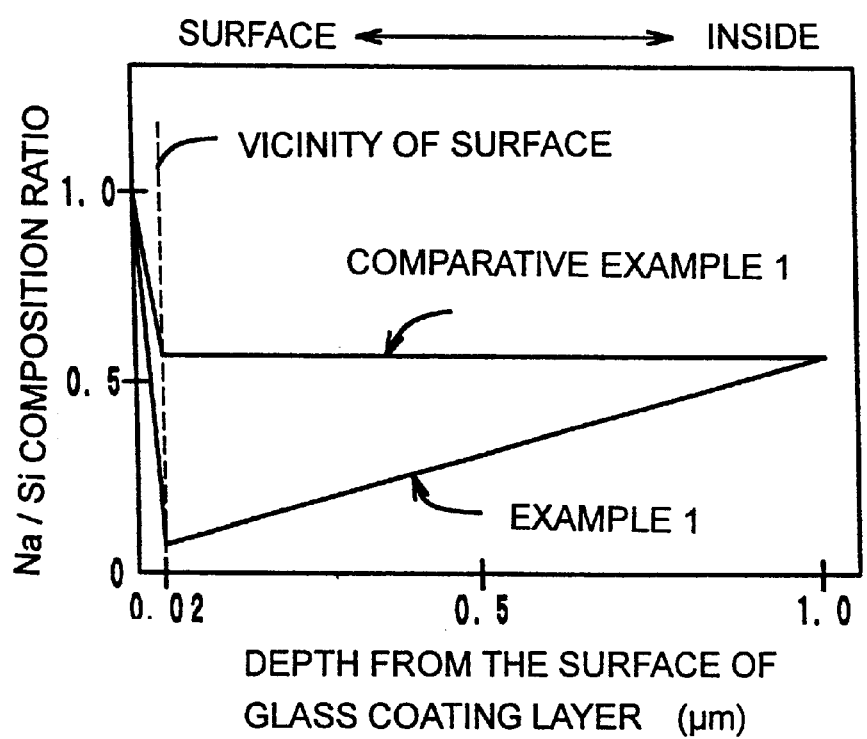
FIG. 2 is a graph showing concentration gradients in the atomic ratio of an alkali metal content to a silicon content in glass coating layers in Example 1 and Comparative Example 1.

In FIG. 2, the concentration gradient data of the alkali metal content to the silicon content (Na/Si atomic ratio) in the individual glass coating layers formed in Example 1 and Comparative Example 1 are shown. This data was obtained by measuring the laminated capacitors using Auger electron spectroscopy. In Example 1, the Na/Si atomic ratio gradually increased from the vicinity of the surface to the inside of the glass coating layer. In Comparative Example 1, the Na/Si atomic ratio is stable from the vicinity of the surface to the inside.

Even though the content of Na was high from the surface of the glass coating layer to the vicinity thereof in all laminated capacitors described above, the reason for this is that Na contained in the glass coating layer was precipitated on the surface thereof due to the influence of the moisture and carbon dioxide in the air adsorbed thereon, and hence, the data obtained from the surface to the vicinity of the glass coating layer had no significant meaning in the present invention. In addition, the vicinity of the surface of the laminated capacitor was approximately 0.02 mm deep from the surface of the glass coating layer in Example 1 and Comparative Example 1.

In this connection, the chip-type electronic component of the present invention and the manufacturing method therefor are not limited to the embodiment and the example described above and can be variously changed within the scope of the present invention. In particular, in addition to the laminated capacitor described above, the present invention can be applied to chip-type ceramic electronic components, such as a PTC thermistor, a varistor or a component containing ferrite. In addition, the manufacturing method of the present invention can be naturally applied to the chip-type electronic components mentioned above.

As has thus been described, since the atomic ratio of the alkali metal content to the silicon content is gradually increased from the vicinity of the surface to the inside of the glass coating layer which is provided on the surfaces of the ceramic body according to the present invention, generation of cracks is unlikely to occur in the glass coating layer and the degradation of the insulating resistance of the ceramic body can be suppressed.

What is claimed is:

1. A chip-type electronic component comprising:

a ceramic body; and a glass coating layer having an outer surface and an interior provided on a surface of the body, the glass coating layer comprising an alkali metal and silicon, wherein the ratio of the alkali metal to the silicon in the glass coating layer gradually increases from the vicinity of the outer surface to the interior of the glass coating layer.

2. A chip-type electronic component according to claim 1, wherein the ceramic body comprises a plurality of ceramic layers.

3. A chip-type electronic component according to claim 2, wherein the alkali metal to silicon ratio at the vicinity of the outer surface is at least about 0.3.

4. A chip-type electronic component according to claim 2, wherein the alkali metal to silicon ratio at the vicinity of the outer surface is at least about 0.6.

5. A method for manufacturing a chip-type electronic component, comprising the steps of:

providing a ceramic body having a glass coating layer on a surface thereof, in which the ratio of an alkali metal to the silicon in the glass coating layer is at least about 0.3; and dipping the body provided with the glass coating layerin an acidic aqueous solution.

6. The method of claim 5, wherein the glass coating layer has a ratio of alkali metal to silicon of at least about 0.6.

7. The method of claim 6, wherein the acidic aqueous acidic solution comprises sulfuric acid.

8. The method of claim 7, further comprising applying the glass coating layer to the ceramic body.

9. The method of claim 6, further comprising applying the glass coating layer to the ceramic body.

10. The method of claim 5, further comprising applying the glass coating layer to the ceramic body.

11. The method of claim 10, wherein the acidic aqueous acidic solution comprises sulfuric acid.

12. The method of claim 5, wherein the acidic aqueous acidic solution comprises sulfuric acid.

* * * * *